US006507575B1

United States Patent
Dajer et al.

(10) Patent No.: US 6,507,575 B1
(45) Date of Patent: *Jan. 14, 2003

(54) APPARATUS AND METHOD FOR SHARING A SIGNALING CHANNEL

(75) Inventors: Miguel Dajer, Succasunna, NJ (US); Mark H. Kraml, Flanders, NJ (US); Harvey Rubin, Township of Morris, Morris County, NJ (US); Keith Elden Strege, Branchburg Township, Somerset County, NJ (US)

(73) Assignee: Lucent Technoligies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,389

(22) Filed: Aug. 29, 1997

(51) Int. Cl.$^7$ .................................................. H04J 3/00
(52) U.S. Cl. ........................................ 370/337; 370/328
(58) Field of Search ................................. 370/337, 347, 370/349, 465, 470, 442, 522, 458, 235, 236, 264, 277, 310, 328, 329, 321; 375/220, 221

(56) References Cited

U.S. PATENT DOCUMENTS

| | | | | |
|---|---|---|---|---|
| 4,607,364 A | * | 8/1986 | Neumann et al. | 370/470 |
| 4,809,268 A | * | 2/1989 | Tejima et al. | 370/346 |
| 5,003,533 A | * | 3/1991 | Watanabe | 370/258 |
| 5,313,461 A | * | 5/1994 | Ahl et al. | 370/349 |
| 5,507,006 A | * | 4/1996 | Knight | 455/422 |
| 5,572,546 A | * | 11/1996 | Serfaty et al. | 375/221 |
| 5,590,400 A | * | 12/1996 | Lopponen | 455/509 |
| 5,648,958 A | * | 7/1997 | Counterman | 370/458 |
| 5,699,356 A | * | 12/1997 | Beever et al. | 370/329 |
| 5,715,245 A | * | 2/1998 | Sounvieri | 370/337 |
| 5,748,104 A | * | 5/1998 | Argyrousdis et al. | 340/870.11 |
| 5,960,362 A | * | 9/1999 | Grob et al. | 455/527 |

FOREIGN PATENT DOCUMENTS

| | | | | |
|---|---|---|---|---|
| CA | 2191449 | 12/1995 | | |
| WO | WO98/37669 | 8/1998 | ........... | H04L/12/56 |

OTHER PUBLICATIONS

James F. Whitehead, "Distributed Packet Dynamic Resource Allocation (DRA) for Wireless Networks," IEEE 46$^{th}$ Vehicular Technology Conference, Mobile Technology for The Human Race Atlanta, Apr. 28–May 1, 1996, vol. 1, No. CONF. 46, Apr. 28, 1996, pp. 111–115, XP000594286, Institute of Electrical and Electronics Engineers, p. 111, col. 1, line 1–line 11, p. 112, col. 1, line 45–col. 2, line 42; figure 1.

* cited by examiner

Primary Examiner—Dang Ton
Assistant Examiner—Brian Nguyen
(74) Attorney, Agent, or Firm—Harness, Dickey & Pierce, P.L.C.

(57) ABSTRACT

The present invention is an apparatus and a method for sharing a communication channel among two or more base stations connected to a base station controller via a common transmission line in a channelized format. The present invention allows each of the base stations to receive data transmitted over a shared communication channel from the base station controller, to determine whether the data transmitted from the base station controller is intended for that base station, and to insert its data into the communication channel without interfering with data transmitted by other base stations over the communication channel. In one embodiment, each of the base stations is configured to bridge onto the transmission facility such that signaling messages being transmitted over a signaling channel may be received by all of the base stations. The signaling messages has associated identifiers for specifying particular base stations to which the signaling messages are intended. In another embodiment, each of the base stations can insert its signaling message into the data stream over the signaling channel without interfering with signaling messages already in the data stream.

15 Claims, 5 Drawing Sheets

APPARATUS AND METHOD FOR SHARING A SIGNALING CHANNEL

FIELD OF THE INVENTION

The present invention relates to telecommunications system and, in particular, to wireless communications system using a common transmission line to connect a plurality of base stations to a base station controller.

BACKGROUND OF THE RELATED ART

Wireless communication systems generally use transmission lines that are configured in a channelized format, such as T1 or E1 facilities, to connect a set of base stations to a base station controller (BSC). FIG. 1 illustrates a wireless communication system 10 in which a BSC 12 is individually connected to base stations 14-i via respective T1 facilities 16-i, where i=1, 2, . . . , n. Each of the T1 facilities 16-i includes a downlink path 17-i and an uplink path 19-i, as shown in FIG. 2, for the transmission of data to and from the base stations 14-i, respectively. Each of the paths 17-i, 19-i is configured into a channelized format—that is, the paths are divided into transmission time slots. FIG. 3 illustrates a manner for channelizing the paths 17-i, 19-i. Each of the paths 17-i, 19-i is divided into frames having a framing time slot and twenty-four $DS0_j$ time slots, where j=1, 2, . . . , 24 and each of the $DS0_j$ time slots has a 64 Kbps bandwidth. Thus, the wireless communication system 10 has a 24·n number of $DS0_j$ time slots in the downlink direction and 24·n number of $DS0_j$ time slots in the uplink direction.

The $DS0_j$ time slots are used to form communication channels, including a signaling channel and a plurality of traffic channels. Each communication channel includes at least one $DS0_j$ time slot in the downlink path 17-i and the uplink path 19-i. For purposes of discussion, a $DS0_j$ time slot shall be hereinafter deemed to refer to both a $DS0_j$ time slot in the downlink path and a $DS0_j$ time slot in the uplink path, unless otherwise specified.

Each of the base stations 14-i uses x number of $DS0_j$ time slots as a signaling channel for transmitting control information between the base station 14-i and the BSC 12, where x≧1. Each of the base stations 14-i can support enough user traffic to consume p number of traffic channels (for transmitting the user traffic between the base station 14-i and the BSC 12 and a voice switch, not shown), wherein a traffic channel comprises y number of $DS0_j$ time slots and y≧1. Thus, the T1 facilities 16-i should at least have a bandwidth that includes q number of $DS0_j$ time slots, where q=y·p+x.

Generally, each of the T1 facilities 16-i has a bandwidth that includes more than q number of $DS0_j$ time slots—that is, the user traffic supported by an individual base station (and the control information) does not consume the entire bandwidth available on a T1 facility (i.e., q<n). Thus, the base station does not use some $DS0_j$ time slots resulting in inefficient utilization of the T1 facility.

To more efficiently utilize T1 facilities and reduce the cost of a wireless communication system, one or more T1 facilities may be shared by a plurality of base stations. FIG. 4 illustrates a wireless communication system 20 in which a daisy chain configuration is used to connect n number of base stations 22-i to a BSC 24 via a common T1 facility 26. Unlike the wireless communication system 10, the wireless communication system 20 has a total of 24 number of $DS0_j$ time slots (compared to 24·n number of $DS0_j$ time slots in the wireless communication system 10). Like the base stations 14-i, each of the base stations 22-i has its own signaling channel comprising x number of $DS0_j$ time slots—that is, n·x number of $DS0_j$ time slots on the T1 facility 26 are used as signaling channels. The remaining $DS0_j$ time slots in the T1 facility 26, i.e., m−n·x, can be used as traffic channels. The number of remaining $DS0_j$ time slots should be at least equal to the total number of $DS0_j$ time slots needed by the base stations 22-i to support user traffic, i.e., 24−n·x·y·p·n. Recall that n represents the total number of base stations, x represents the number of $DS0_j$ time slots composing a signaling channel, y represents the number of $DS0_j$ time slots composing a traffic channel, and represents the number of traffic channels consumable by user traffic per base station.

In some cases, the total number of $DS0_j$ time slots needed by the base stations to support user traffic is greater than the number of remaining $DS0_j$ time slots. In these cases, more $DS0_j$ time slots (or traffic channels) are required to support the user traffic. For example, suppose the wireless communication system 20 includes five base stations (i.e., n=5), each signaling channel and traffic channel comprises one $DS0_j$ time slot (i.e., x=1 and y=1), and the user traffic supported by each of the base stations 22-i consumes four traffic channels (i.e., p=4). If each base station 2-i has its own signaling channel (for a total of five $DS0_j$ time slots), then there would only be nineteen $DS0_j$ time slots available for use as traffic channels by the five base stations. Since each base station supports enough user traffic to consume four traffic channels, twenty $DS0_j$ time slots are needed by the wireless communication system for traffic channels. Because the T1 facility has only nineteen $DS0_j$ time slots available for use as traffic channels, the needs of the wireless communication system 20 would exceed the capacity of the T1 facility.

One way to increase the number of $DS0_j$ time slots available for use as traffic channels is to use additional T1 facilities. Such a solution would undesirably increase the cost of the wireless communication system. Accordingly, there exists a need for increasing the number of $DS0_j$ time slots available for use as traffic channels in a T1 facility connecting two or more base stations to a base station controller.

SUMMARY OF THE INVENTION

The present invention provides an apparatus and a method for increasing the number of $DS0_j$ time slots available for use as traffic channels in a T1 or E1 facility connecting two or more base stations to a base station controller by sharing a signaling channel among the base stations. The present invention is based on the concept that a single base station does not utilize the entire bandwidth of the signaling channel for the transmittal of signaling messages, i.e., control information for managing resources at one or more base stations. Better utilization of the signaling channel bandwidth can be achieved if two or more base stations can share the same signaling channel which, in turn, results in making more $DS0_j$ time slots available fox use as traffic channels. To share a signaling channel, the wireless communication system should be configured such that each of the base stations can receive its signaling over a downlink the signaling channel, and transmit its signaling messages to the base station controller over an uplink signaling channel without interfering with signaling messages transmitted by other base stations over the uplink signaling channel.

In one embodiment, the base station controller transmits over the downlink signaling channel a downlink signaling message with an associated identifier which specifies the base station to which the signaling message is intended. Each of the base stations bridges or taps onto the transmission facility to receive the downlink signaling message and identifier. This permits downlink signaling messages and identifiers to pass transparently through the receiving base station and to other base stations in the wireless communication system. The receiving base station examines the identifier to determine whether the associated downlink signaling message is intended for that base station. If yes, the base station executes instructions contained within the downlink signaling message. Otherwise, the downlink signaling message is ignored.

In another embodiment of the present invention, each of the base stations transmits its uplink signaling message to the base station controller without interfering (e.g., overwriting) with uplink signaling messages transmitted by other base stations. In this embodiment, the base station receives uplink signaling messages (and associated identifiers) transmitted by other base stations over the uplink signaling channel to the bas station controller. The receiving base station stores the received uplink signaling message in memory associated with that base station. Also stored within the same (or different) memory may be an uplink signaling message (and identifier) generated by the receiving base station for transmission to the base station controller. Any signaling messages stored in the memory of the receiving base station is then transmitted to the base station controller on a "first-in, first-out" basis over the uplink signaling channel. Hence, signaling messages from all base stations in the wireless communication system are assured of being transmitted to the base station controller.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
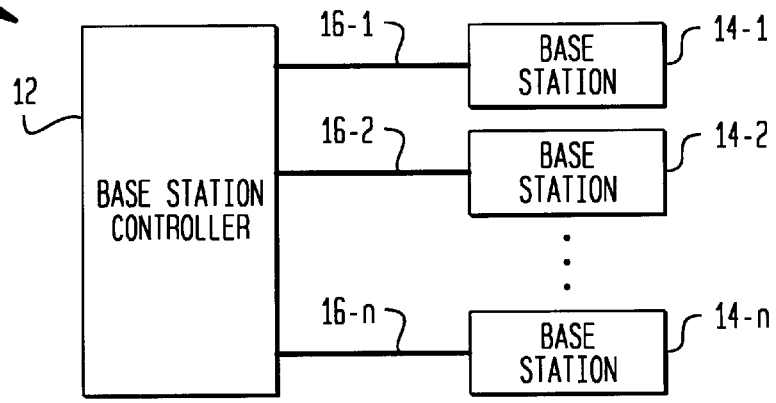
FIG. 1 depicts a wireless communication system in which each of a plurality of base stations has an associated T1 facility for connecting to a common base station controller.
Figure 2:
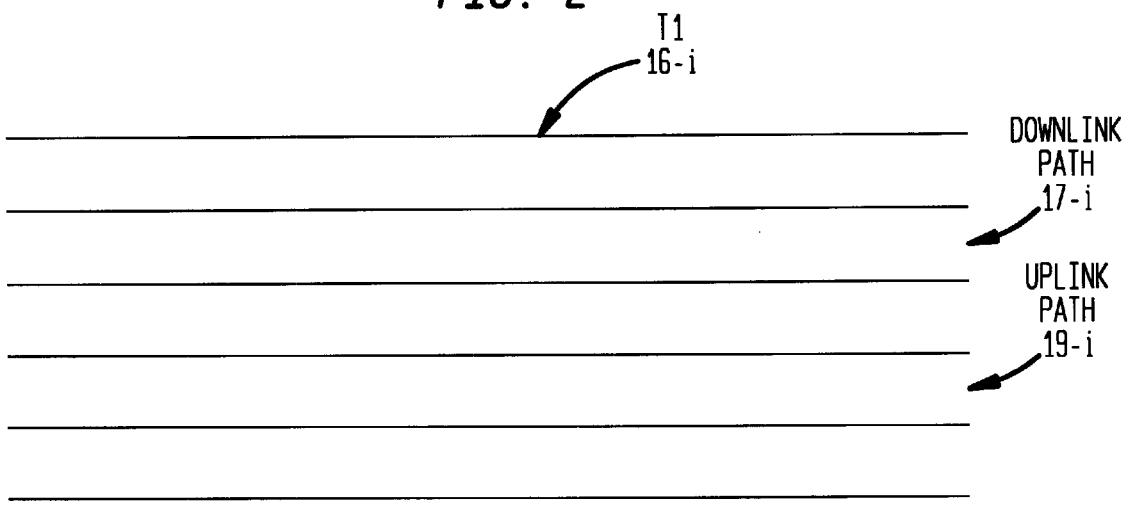
FIG. 2 depicts a T1 facility comprising of an uplink path and a downlink path.
Figure 3:
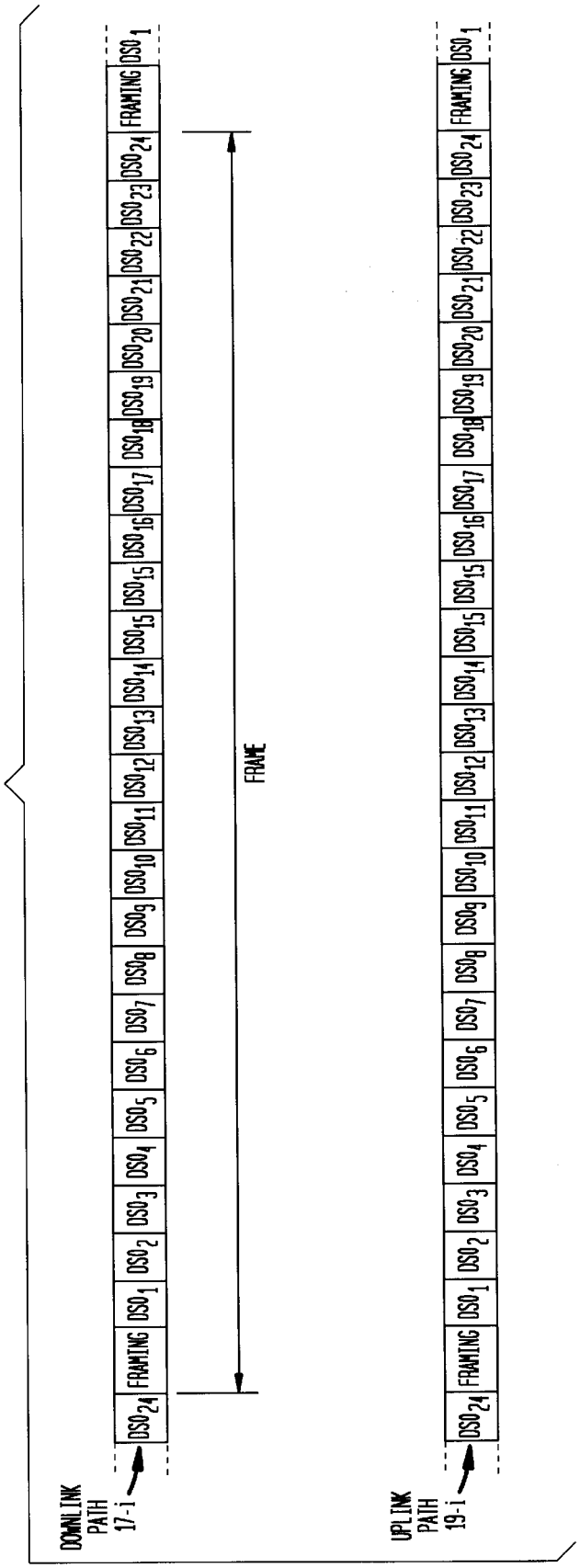
FIG. 3 depicts a manner for channelizing a T1 facility.
Figure 4:
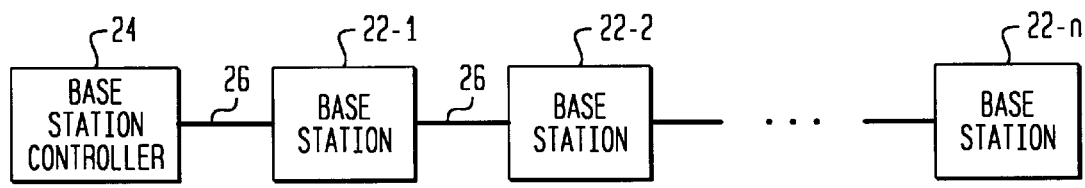
FIG. 4 depicts a wireless communication system in which a "daisy chain" configuration is used to connect a plurality of base stations to a base station controller via a common T1 facility.
Figure 5:
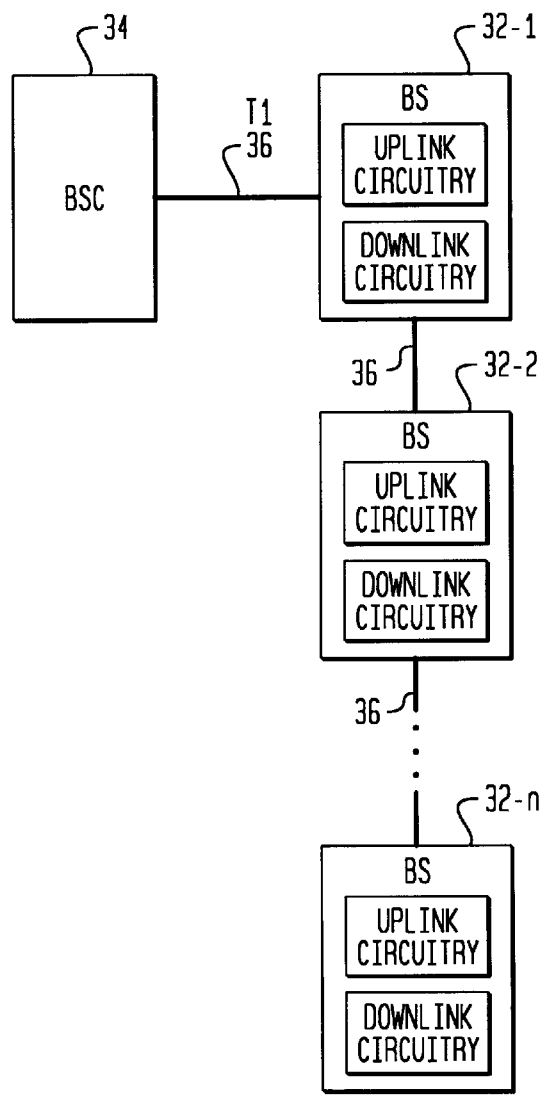
FIG. 5 depicts a wireless communication system comprising a plurality of base stations connected to a base station controller via a common T1 facility in accordance with one embodiment of the present invention.
Figure 6:
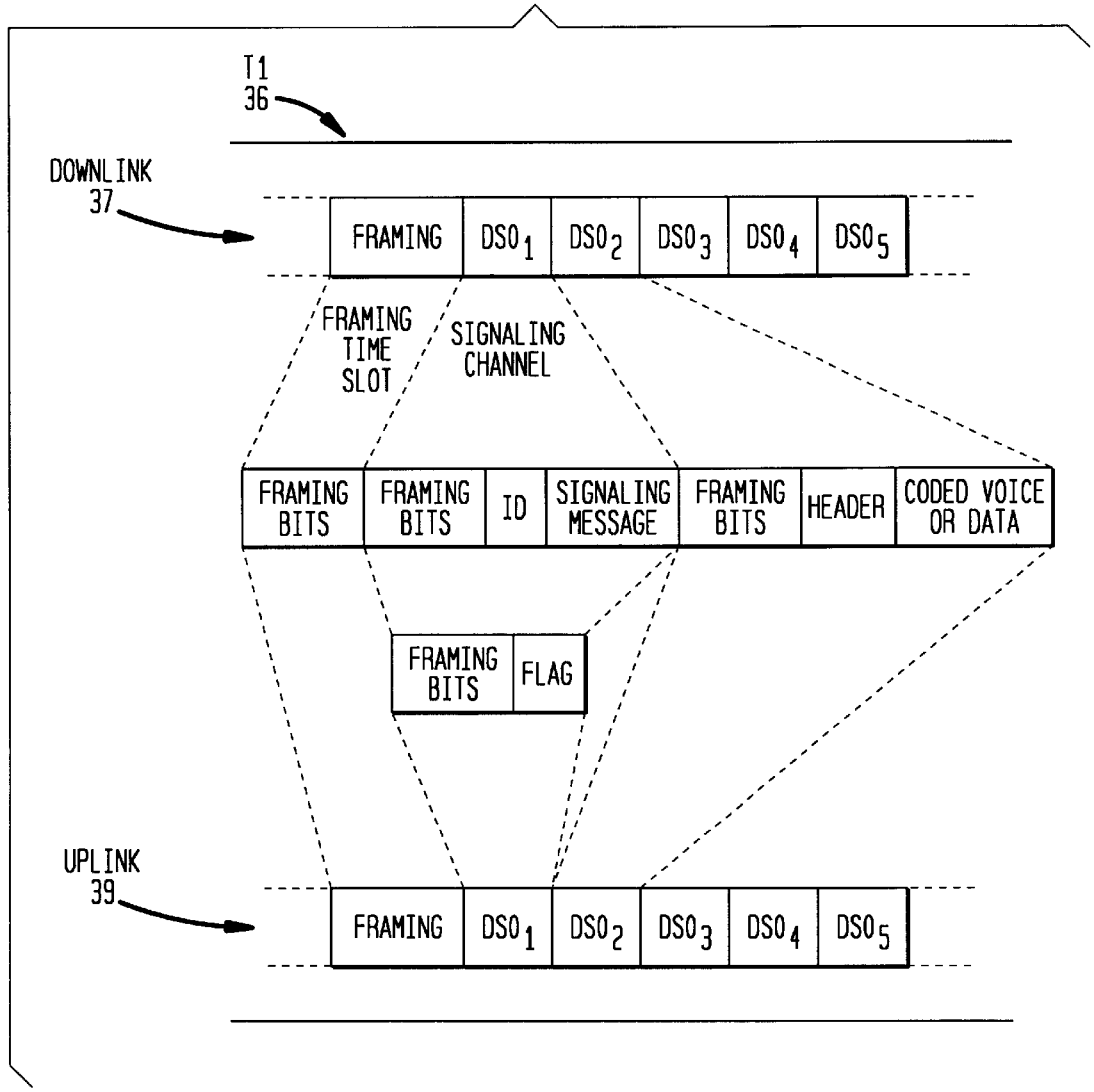
FIG. 6 depicts data formats for transmissions over downlink and uplink paths of T1 facilities in accordance with one embodiment of the present invention.

FIG. 5 shows a wireless communication system 30 comprising a plurality of base stations 32-i and a base station controller (BSC) 34 used in accordance with the present invention, where i=1, 2, . . . , n. The base stations 32-i are connected to the BSC 34 in a daisy chain configuration using a common T1 facility 36 configured in a channelized format. FIG. 6 illustrates the data formats for transmissions over the downlink and uplink paths 37, 39 of the T1 facility 36. In the downlink and uplink framing time slots, transmissions include a predetermined sequence of bits (referred to herein as framing bits). These framing bits provide a point of reference for determining the beginning of a frame. In the downlink and uplink signaling channel $DS0_j$ time slots, transmissions include additional framing bits for indicating the beginning of the signaling channel and one of the following: a downlink or uplink signaling message with an identifier for specifying a particular base station; or flag characters indicating the absence of signaling messages. In the downlink signaling channel, the identifier specifies a base station to which the associated downlink signaling message is intended. In the uplink signaling channel, the identifier specifies a base station from which the associated uplink signaling message was transmitted.

Similarly, in the downlink and uplink traffic channel $DS0_j$ time slots, transmissions include additional framing bits for indicating the beginning of a particular traffic channel, downlink or uplink user traffic (e.g., coded voice or data), and a header indicating a mobile-telephone. In the downlink traffic channel, the header indicates a mobile-telephone to which the downlink coded voice or data is intended. In the uplink traffic channel, the header indicates a mobile-telephone from which the uplink coded voice or data was transmitted.

The BSC 34 is a device for controlling the resources of the base stations 32-i and for setting up the relaying of user traffic between the base stations 32-i and a land-line network (such as a public switched telephone network connected to the BSC 34 via a mobile switching center), not shown. The BSC 34 includes control software executing on a processor 38 for processing and generating uplink and downlink signaling messages.

Figure 7:
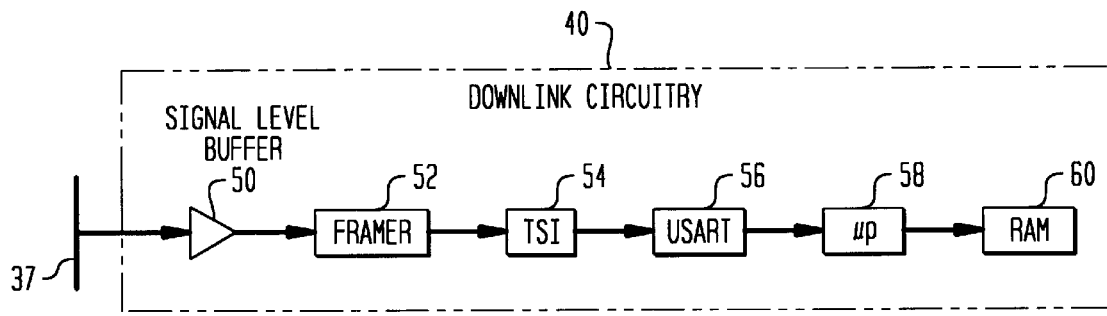
FIG. 7 depicts a downlink circuitry in accordance with one embodiment of the present invention.

The base stations 32-i are devices for interfacing between mobile-telephones and a land-line network. Each of the base stations 32-i includes a downlink circuitry 40 and an uplink circuitry 42 for processing data transmitted over the downlink or uplink signaling channels, respectively, as will be explained herein. FIG. 7 is a simplified schematic of the downlink circuitry 40 in accordance with one embodiment of the present invention. The downlink circuitry 40 includes a signal level buffer 50, a framer 52, a time slot interchanger (TSI) 54, an universal synchronous-asynchronous receiver transceiver (USART) 56, a microprocessor 58 and random access memory (RAM) 60. The signal level buffer 50 is connected to the downlink path 37 to reduce the load on the T1 facility 36. The signal level buffer 50 permits the base station to bridge or tap onto the downlink path without delaying or interrupting the bit stream being transmitted over the downlink path. The downlink bit stream is passed through the signal level buffer 50 to the framer 52, which is a device having functionality for detecting or finding the beginning of a frame and/or a communication channel (e.g., signaling channel or traffic channel) using the framing bits. Upon detecting the beginning of a frame or a communication channel in the downlink bit stream, the framer 52 sends an indication to the TSI 54 that the beginning of a frame or a particular communication channel has been detected.

The TSI 54 is a device for selectively terminating and repeating (or forwarding) data and is well-known in the art. When the TSI 54 receives the indication, the TSI 54 will know the next set of bits was transmitted at the beginning of the frame and/or over a particular communication channel. The TSI 54 is configured to pass the set of bits transmitted over the downlink signaling channel (i.e., downlink signaling channel bits) to the USART 56. The USART 56 is a device for examining the set of downlink signaling channel bits (or part thereof) for the presence of signaling messages, and is well-known in the art. Specifically, the USART 56 will look for the flag characters indicating the absence of signaling messages. For example, suppose the flag characters comprise a "1000001" bit sequence. If the USART 56 does not detect the flag characters (e.g., 10000001), the USART passes the set of downlink signaling channel bits to the microprocessor 58 which, in turn, will store such set of bits in the RAM 60. If the USART 56 detects the flag characters, the USART 56 discards the set of downlink signaling channel bits and does not pass them to the microprocessor 58.

Anytime the USART 56 detects flag characters in a set of downlink signaling channel bits and a signaling message in a next set of downlink signaling channel bits, the USART 56 will transmit an interrupt signal to the microprocessor 58 indicating that the next set of bits is the beginning of a signaling message. Likewise, anytime the USART 56 detects a signaling message in a set of downlink signaling channel bits and flag characters in a next set of downlink signaling channel bits, the USART 56 will transmit an interrupt signal to the microprocessor 58 indicating that the former set of bits was the end of the signaling message. When a complete signaling message is in the RAM 60, the microprocessor 58 examines the identifier associated with the stored signaling message to determine whether the signaling message is intended for its base station. If yes, the microprocessor will process the signaling message. If no, the microprocessor discards the signaling message.

Figure 8:
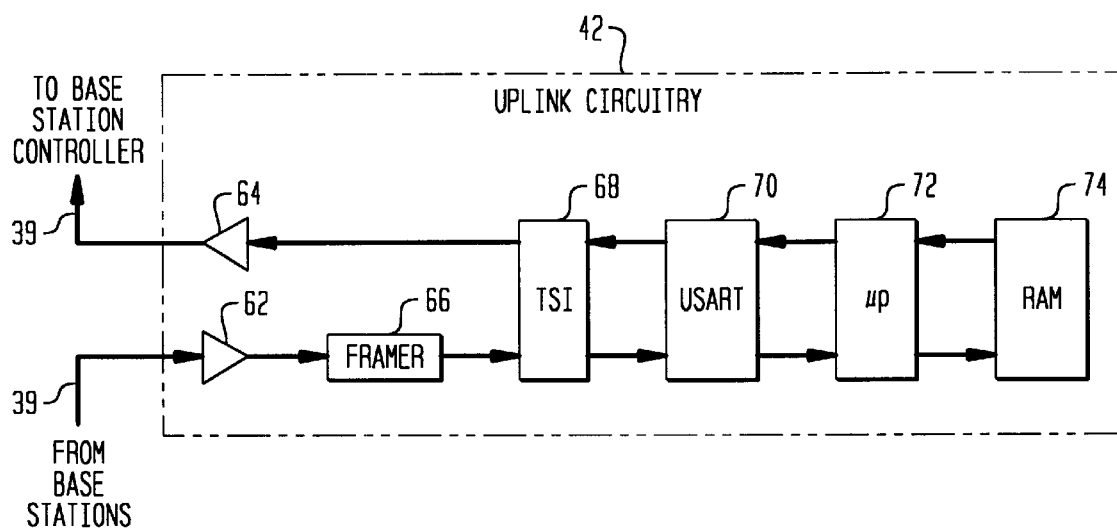
FIG. 8 depicts an uplink circuitry in accordance with one embodiment of the present invention.

FIG. 8 is a simplified schematic of the uplink circuitry 42 in accordance with one embodiment of the present invention. The uplink circuitry 42 includes signal level buffers 62, 64, a framer 66, a TSI 68, a USART 70, a microprocessor 72 and RAM 74. The signal level buffer 62 is connected to the uplink path 39 to reduce the load on the T1 facility 36. The uplink data is passed through the signal level buffer 62 to the framer 66, which searches for the beginning of a frame and/or a communication channel in the uplink bit stream. Upon detecting the beginning of a frame and/or a communication channel, the framer 66 sends an indication to the TSI 68 that the beginning of a frame and/or a communication channel has been detected.

The TSI 68 is configured to pass the set of bits transmitted over the uplink traffic channel back into the uplink traffic channels via the signal level buffer 64, and to pass the set of bits transmitted over the signaling channel to the USART 70. The USART 70 will process uplink signaling channel bits in the same manner the USART 56 processes downlink signaling channel bits. The signaling messages passed from the USART 70 to the microprocessor 72 will be stored by the microprocessor 72 in RAM 74. Note that the signaling messages passed by the USART 70 are signaling messages generated by other base stations in the wireless communication system. In addition to these signaling messages, stored within RAM 74 may also be a signaling message generated by the base station to which the microprocessor 72 is a part (i.e., receiving or current base station). Signaling messages (generated by the current base station or other base stations) stored in the RAM 74 are passed back to the USART 70 on a "first-in, firstout" basis. The USART 70, in turn, will pass the signaling messages from the microprocessor 72 to the TSI 68. Anytime the USART 70 does not receive a signaling message from the microprocessor to pass to the TSI 68, the USART 70 will pass flag characters to the TSI 68. The TSI 68 will insert the bits passed from USART 70 into the uplink signaling channel via the signal level buffer 64, thus transmitting all the signaling messages to the base station controller.

Note that the present invention should not be limited to an apparatus and method for sharing a signaling channel. The present invention can also be used to share other communication channels. Further note that the present invention should not be limited to being used in a wireless communication system in which the base stations are connected in a daisy chain configuration to a base station via a common T1 facility. Other configurations, such as parallel configurations, and other transmission facilities are possible. Therefore, the spirit and scope of the present invention should not be limited to the description of the embodiments contained herein.

We claim:

1. A wireless communication system having a plurality of base stations interconnected by a common transmission facility that is configured in a channelized format, wherein each of the plurality of base stations comprises:

a signal level buffer for receiving data transmitted over the transmission facility;

a framer for receiving the data from the signal level buffer, for detecting a beginning of a frame in the data and for outputting the frame with an indicator identifying the beginning of the frame;

a time slot interchanger for receiving the frame and the indicator output from the framer, and for outputting predetermined portions of the frame using the indicator;

a universal synchronous-asynchronous receiver transceiver for receiving the predetermined portions output from the time-slot interchanger, for examining subsets of the predetermined portions of the frame, for outputting interrupt signals if the subsets are flags, and for outputting the subsets if the subsets are not flags; and a microprocessor for receiving the outputs of the universal synchronous-asynchronous receiver transceiver and examining an identifier associated with a signaling message composed of the outputs of the universal synchronous-asynchronous receiver transceiver which are not interrupt signals.

2. The wireless communication system of claim 1, wherein the microprocessor is operable to output a signaling message with an identifier to the time slot interchanger.

3. The wireless communication system of claim 2, wherein the time slot interchanger is operable to insert the signaling message and identifier outputted by the microprocessor into a predetermined portion of a frame in data being transmitted over the transmission facility.

4. A method for sharing a signaling channel in a wireless communication system having a plurality of base stations connected in series via a transmission facility, the transmission facility having a plurality of time slots, comprising:

accessing, at one of the plurality of base stations, downlink data received over the signaling channel of the transmission facility, the signaling channel including a fixed number of time slots; and determining, at the accessing base station, whether a received identifier in the downlink data of the signaling channel matches an identifier of the accessing base station; and processing a signaling message associated with the received identifier when the determining step determines a match between the received identifier and the identifier of the accessing base station.

5. The method of claim 4, further comprising:

forwarding the downlink data of the signaling channel to one of the base stations downlink from the accessing base station.

6. The method of claim 4, further comprising:

receiving, at the accessing base station, another communication channel of the transmission facility, the another communication channel having at least one time slot.

7. The method of claim 6, wherein the another communication channel is a traffic channel, and a portion of the downlink data received over the traffic channel includes user traffic.

8. The method of claim 7, further comprising:

transmitting the user traffic to at least one mobile-telephone within a coverage area associated with the accessing base station.

9. The method of claim 7, further comprising:

forwarding the user traffic to another of the plurality of base stations using the traffic channel over which the user traffic was received.

10. The method of claim 4, wherein the accessing step stores the accessed downlink data in a memory of the accessing base station.

11. A method for sharing a signaling channel in a wireless communication system having a plurality of base stations connected in series to each other via a transmission facility, the transmission facility having a plurality of time slots, the method comprising the steps of:

receiving, at one of the plurality of base stations, signaling data over the signaling channel of the transmission facility from one of the plurality of base stations downlink from the receiving base station, the signaling channel having a fixed number of time slots;

storing the received signaling data at the receiving base station; and forwarding stored signaling data from the receiving base station to one of the plurality of base stations uplink from the receiving base station over the signaling channel.

12. The method of claim 11, further comprising:

storing generated signaling data generated by the receiving base station.

13. The method of claim 12, wherein the storing the received signaling data step stores the received signaling data in a memory of the receiving base station;

the storing generated signaling data step stores the generated signaling data in the memory of the receiving base station; and the forwarding step forwards signaling data stored in the memory over the signaling channel.

14. The method of claim 13, wherein the forwarding step forwards oldest signaling data stored in the memory over the signaling channel.

15. The method of claim 11, wherein the signaling data includes information indicating from which one of the plurality of base stations the signaling message originated.

* * * * *